Figure 3:
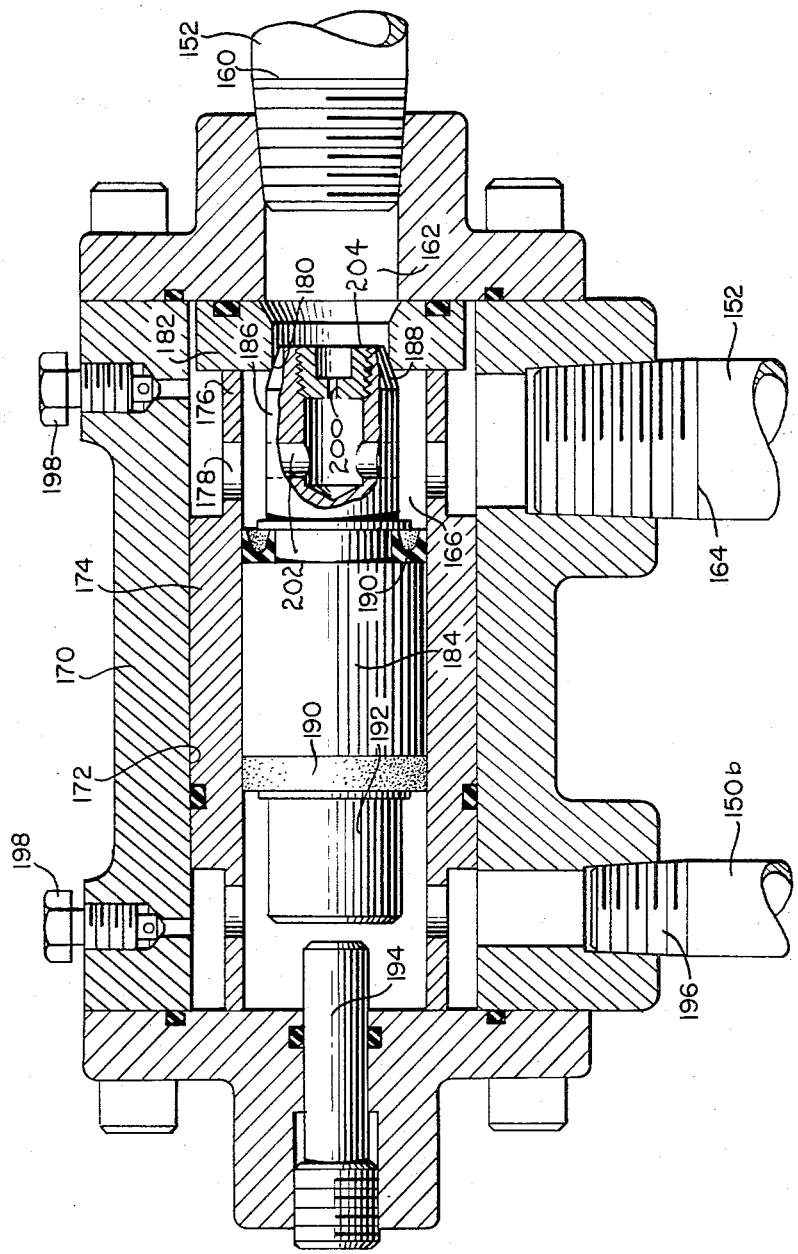

Feb. 27, 1968    W. H. VAN DEBERG    3,370,428
DECELERATING AND RETURN DEVICE FOR MACHINE ELEMENT
Filed Nov. 7, 1966    2 Sheets-Sheet 1
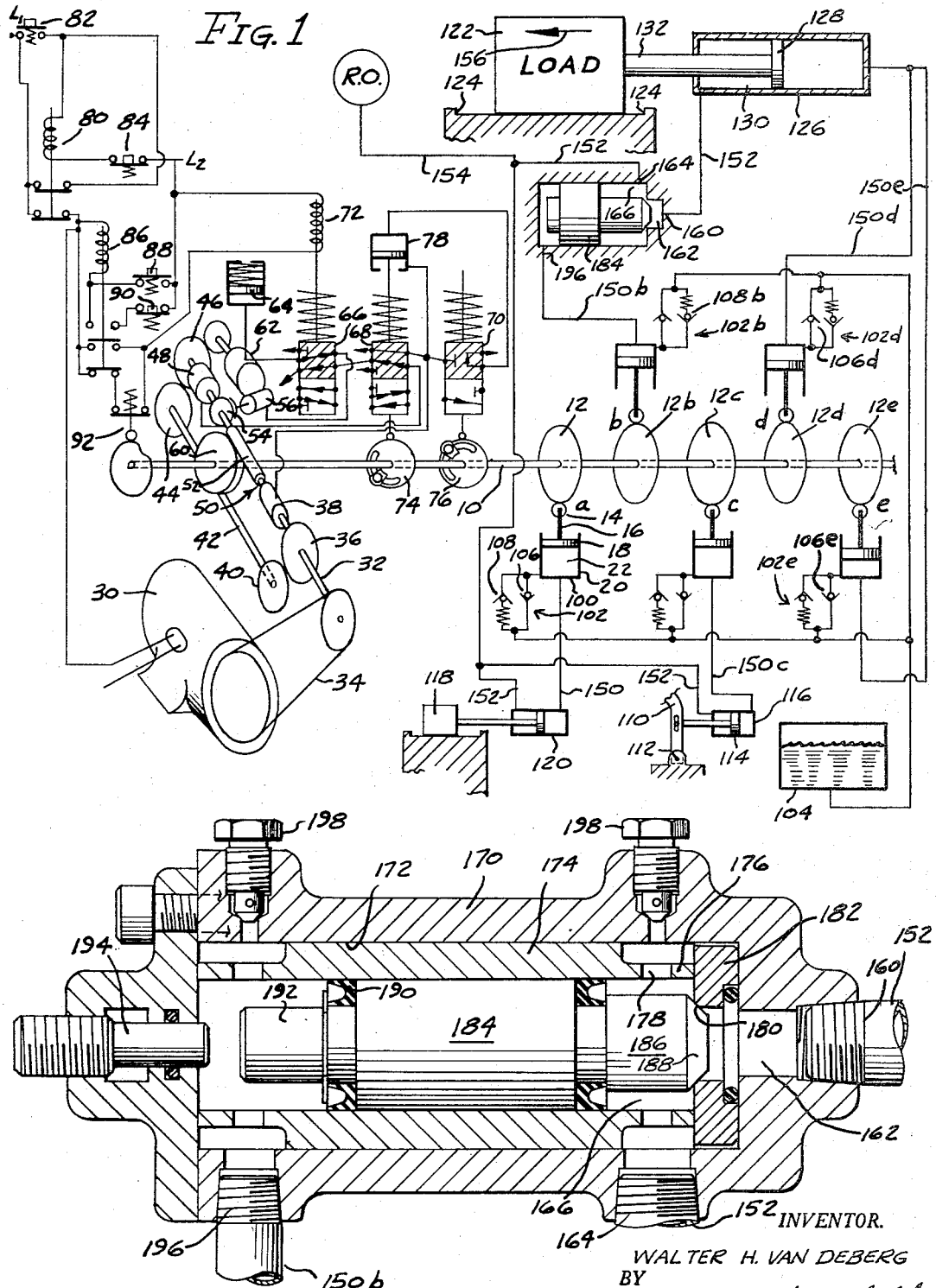
INVENTOR.
WALTER H. VAN DEBERG
BY
John D. Fairchild
AGENT INVENTOR.
Walter H. Van Deberg
BY
J. L. Chisholm
ATTORNEY

United States Patent Office 3,370,428
Patented Feb. 27, 1968

3,370,428
DECELERATING AND RETURN DEVICE FOR MACHINE ELEMENT
Walter H. Van Deberg, Berkley, Mich., assignor to Earl A. Thompson Manufacturing Co., Ferndale, Mich., a corporation of Michigan
Continuation-in-part of application Ser. No. 467,166, June 1, 1965. This application Nov. 7, 1966, Ser. No. 592,444
20 Claims. (Cl. 60—54.5)

This application is a continuation-in-part of my application Ser. No. 467,166 filed June 1, 1965, which is abandoned, which in turn is a continuation of my application Ser. No. 210,028 filed July 16, 1962, which is abandoned.

This invention relates to power transmission and control devices and more particularly to devices for cyclically moving elements, such as various operating parts of machine tools.

As one example of a system in which my invention is of advantage, a mechanico-hydraulic motivator may be used to power and control automatic machinery of any type which includes one or more members which must be moved to and fro such as slides on a machine bed. One type of mechanico-hydraulic motivator which is readily adaptable to such machinery is the type deriving its basic motion from rotary cams. A plurality of cams rotated in unison each actuate a single-acting expansible chamber type transmitter, such as a pulsator piston reciprocated in a fixed cylinder by a cam follower. A double-acting expansible chamber type receiver, such as a pulse response piston reciprocated in a cylinder, may be connected to a slide or other load device or driven element on the machine which is to be moved away from one limit stop defining a rest position and to another limit stop defining an advanced position, and then returned. A liquid column interconnecting the transmitter and the receiver to conduct motions therebetween may be confined in a grid or a flexible conduit to provide utmost adaptability for modern complex production machines. A combined replenishing and relief valve arrangement may connect each liquid column with a liquid reservoir to balance the volume of liquid in each closed motion transfer section of the motivator.

In such automatic machinery it is usual to have liquid under pressure which maintains in one end of each double-acting receiver a counterbias, counterforce, or return force, which means a constantly present, yielding force in the direction opposite to the advancing movement of the machine element. This force opposes advancement, decelerates and stops the advancing element, and returns it to its inital position. When the driving cam presents a falling contour to the transmitter, the pressurized liquid causes the entire closed motion transfer section to follow the cam, and thus causes the driven element connected to the receiver to be moved back to its rest position with a desired motion accurately determined by the falling cam face.

Certain problems and limitations, however, have been encountered in such constant return liquid or common counter-bias systems. There is inherent a definite weight limit to the load device which may be moved at a rapid speed by a given section of the motivator. While the cam actuated pulsator has ample power to accelerate a massive slide against the return force and move it the required distance in a minimum time, the ordinary return system does not have sufficient effective power acting in opposition to decelerate the load slide and stop it gently without slamming the limit stop. This is because the common return system must provide only sufficient return force for the majority of the moving elements on a given machine which are of low mass, and is thus inadequate for stopping a heavy load or slide which must be shifted quickly in at least one of the two directions of to-and-fro shifting. The provision of a large piston area upon which the standard return fluid may act to correspondingly increase the effective return power for a given driven element is not practical beyond certain limits, because the cam actuated pulsator must then overcome this increased return force as well as the inertia of the load itself in order to start the load.

Accordingly, it is an object of the present invention to provide a stopping device in a mechanico-hydraulic motivator which may alter its effective force at a predetermined point each cycle to accommodate massive machine elements which require rapid transfer.

More specifically it is an object to provide a normally constant pressure return system having means for increasing the pressure to a higher constant value when the moving element reaches a particular position.

Another object is to provide, in a return system for a mechanico-hydraulic motivator, a momentum absorbing arrangement for substantially increasing the effective power of the return when needed during each cycle to decelerate and stop a rapidly moving massive slide on a machine.

Another object is to provide an improved arrangement for slowing a rapidly moving large mass and easing it very gently against its stop at the end of its travel. More specifically it is an object to provide a constantly operating relatively small opposing force and an additional intermittently operated relatively large opposing force together with an arrangement removing the large force near the end of the decelerating period so that the constantly operating small force completes the deceleration of the mass.

It is another object to provide a mechanico-hydraulic motivator for cyclically moving a number of machine elements of varying masses in which a common fluid pressure system provides counterforce for all of the elements, and which has means for increasing the counterforce on one element at one particular point in its cycle of movement without affecting the counterforce on the other elements.

Further objects and advantages of the present invention will be apparent from the following detailed description, with reference to the accompanying drawings in which like reference characters refer to the same parts throughout the several views, and in which:

FIGURE 1 is a view in schematic fashion of a known mechanico-hydraulic power and control unit, showing diagrammatically combined therewith a return system according to one form of this invention; and FIGURE 2 is a longitudinal sectional detail view of an intermittently operable decelerating valve which changes the momentum absorbing stopping force of this invention, FIGURE 3 is a view corresponding to FIG. 2 of a modified form of the invention.

In FIGURE 1, the basic elements of a rotary cam powered and controlled liquid column type motion transfer device are shown. Briefly, such a unit ordinarily comprises a main camshaft 10 having a plurality of rotary cams 12 keyed thereon, each cam having suitable rise and fall ramps to impart a desired motion to a roller type cam follower 14 during each complete revolution or cycle of the cam. Each cam follower 14 is journalled in the end of the rod 16 of a pulsator piston 18 reciprocable within a fixed cylinder 20 in a suitable housing, not shown. The main camshaft 10 may be journalled in the housing so that motions imparted to the followers 14 by the cams 12 will move the pistons 18 to and fro in the cylinders 20 to vary the size of the cylinder chambers 22. Each such unit on the camshaft designated by an appropriate subscript of the series *a* through *e* constitutes a single-acting pulse transmitter of the expansible chamber type to which one end of a liquid column may be connected.

The camshaft 10 may be turned in any suitable manner to operate the hydraulic pulse transmitters cyclically, for example as shown in the U.S. Patent to Thompson 3,071,929 issued Jan. 8, 1963.

The camshaft 10, as previously mentioned, drives a number of cam operated hydraulic pulsator sections designated *a* through *e*, inclusive. Each section may comprise units duplicating the typical single acting pulsator unit above described and may be identified by corresponding reference numerals with the appropriate ones of the reference letters *a* through *e* appended thereto. The head 100 of the cylinder of each unit contains a balancing valve assembly 102 communicating between the pulsator moved liquid column and a liquid reservoir 104, which may be integral with the cam casing.

The balancing valve assembly 102 may comprise a suitable inlet replenishing check valve 106 and an adjustable high pressure relief valve 108, both of which communicate with the low pressure oil reservoir 104. When pressure in the cylinder and liquid column exceeds a certain predetermined value, liquid will be diverted through the relief valve 108 to the reservoir 104; and, when the pressure drops below a given value, liquid will be recharged to the cylinder 20 by means of the replenishing check valve 106.

In order to insure proper synchronization of the driving and driven elements of each motion transfer section, it is desirable to provide a slightly more liquid displacement in the driving or transmitting elements than is present in the respective fluid motors at the opposite end of the liquid column line. The stroke, and consequently the displacement, of the fluid motors may be limited by suitable limit stops built into the motors or associated with the load devices. Thus, at the end of each advancing stroke of the transmitter piston 18, a small amount of liquid will be discharged to the reservoir 104 through the relief valve 108. This amount plus any amount lost by leakage will be replenished to the liquid column at the end of the return stroke by the operation of the replenishing valve 106.

In FIGURE 1 are several typical load devices to be moved to and fro through a cycle which corresponds to the timing of the camshaft cycle, and which represent typical parts of a machine which are operated through a repeated sequence or cycle of motion. One such load device may comprise an arm 110 oscillatable about a pivot point 112 on the machine by the oscillating piston 114 of a shiftable piston fluid motor means 116. Another such load device 118 is shifted to and fro on a machine bed between suitable limit stops by a piston motor 120. An extraordinarily massive load device which must be rapidly shifted according to the concepts of this invention is represented by the block 122 shiftable to and fro between limit stop means 124 on a machine bed by a double acting fluid motor means 126 comprising a piston 128 shiftable in a cylinder 130 and having a rod 132 connected with the load device. All of the fluid motors 116, 120 and 126 with double acting shiftable pistons represent expansible chamber type receivers.

Interconnecting the expansible chamber type receivers with the expansible chamber type transmitters, for the purpose of transferring motion from the cams to the load devices, are the previously mentioned liquid columns 150. The liquid columns may comprise any suitable generally noncompressible hydraulic fluid confined by either rigid conduits or flexible piping to conduct a column or liquid link for to and fro motion between a transmitter and a receiver.

The pulsator section *a* of the motivator is connected by its closed liquid column with the fluid motor 120. The pulsator section *b* connects by means of its liquid column 150*b* with a fluid motor which operates the decelerating valve of this invention. The pulsator section *c* connects by means of its liquid column 150*c* with the typical fluid motor 116. Pulsator sections *d* and *e* both connect by means of their liquid columns 150*d* and 150*e* with one side of the cylinder 130 of the fluid motor 126.

In FIGURE 1, there are shown return fluid lines 152 connected to the return ends of the expansible chamber type receiver motors which ends are opposite the liquid column actuating connections. These lines contain liquid providing return force and communicate with a manifold line 154 containing liquid from a high pressure accumulator RO. Thus each of the individual motion transfer sections is counter-biased to return its load device to the rest position, and to maintain each follower 14 in close contact with its cam 12 as the cam contour recedes from the follower. The liquid in the accumulator RO may be pressurized by any known means that will provide a constant pressure adequate to return the load devices to their rest positions. Preferably, an air-loaded oil reservoir controlled by an air compressor and suitable high pressure relief valve means, not shown, may be utilized for this purpose.

Such a counterbiasing or return liquid system is highly satisfactory for the average load devices represented at 110 and 118 on a modern production machine. A counterbias provided by a pressure of approximately 150 p.s.i., for instance, is ample to return the standard load device or machine part to its rest position. By controlling the size of the piston faces in the fluid motor means which operate the load devices, the desired effective force for element return may be attained.

However, when a very massive load device such as 122 is encountered, which must be shifted rapidly in the direction of the arrow 156 and then slowed in response to the cam contour to a smooth stop without bumping or slamming the limit stop means 124, the standard return oil or counterbias system has insufficient force to decelerate such a load. By providing a large face on the piston 128 of the fluid motor 126 which shifts the load device, more force is obtained, but this is simply additive to the inertia of the load 122 itself and creates a prohibitive resistance for the pulsator sections *d* and *e* attempting to accelerate the load in the direction of the arrow 156.

This invention provides a means for varying the opposing or return force in a given fluid motor, and more specifically provides means for increasing the counter pressure at a given point in each cycle. This provides a momentum absorbing or decelerating force for a machine element such as the load device 122. The return oil line 152 to the fluid motor 126 may be interrupted and provided with a connection 160 to an open chamber 162 and a connection 164 to a cavity 166. Referring to FIGURE 2, the chamber and cavity may be formed in a cast housing 170 having a longitudinal cylindrical aperture 172 to receive a replaceable cylinder sleeve 174. The cavity 166 is formed by means of an axially extending cuff portion 176 on the sleeve 174, and is provided with radial fluid communication ports 178. The chamber 162 is concentrically located and axially aligned with the sleeve 174 and communicates therewith by a fluid escape opening 180 formed in a self-centering replaceable tool steel washer insert 182.

Axially reciprocable within the cylinder 174 is a piston 184 forming a movable wall for the pressure space on its right and having a forwardly extending boss 186 forming a valve member having a conically bevelled end 188 adapted to center and seat in the annular escape opening 180 of the insert 182. The rear face of the piston 184 is sealed by a U ring 190 and is provided with a central boss 192 for striking an adjustable limit stop 194 threaded in the housing 170. The rear portion of the cylinder 174 forms with the piston 184 a fluid pressure motor and communicates by means of a connection 196 with the liquid column 150b from pulsator section b of the mechanico-hydraulic motivator. Suitable air bleed fittings 198 may be provided at high points in the system.

In operation, it will be clear that when the motivator section b is not pressurizing liquid through its liquid column 150b, fluid pressure from RO will shift the piston 184 rearwardly (to the left) against the limit stop 194 and allow communication between the two portions of the line 152 extending from the manifold line 154 to the fluid motor 126. This provides a normal counterbias from the source RO to the piston 128. Rising faces on the cams 12 at pulsator sections d and e may then shift the piston 128 and thus the load 122 rapidly to the left in the direction of the arrow 156 against the normal counterbias provided by the source RO.

When the load 122 has been shifted to the desired point, e.g., about one half of its total traverse to the left and has been fully accelerated by the cams at motivator sections d and e, the cam 12b at motivator section b may then pulse liquid through the liquid column 150b and, via the connection 196, against the rear face of the piston 184 in the cylinder 174.

This can overcome the pressure of RO because the pressure relief valve 108b is set to control the pressure in line 150b to a maximum value above RO. This pressure moves the piston 184 to the right until a restriction is formed between the valve 188 and seat 180 which reduces flow through the lines 152. This increases the pressure in return cylinder 130 until a value is reached determined by the relief valve 108b. At this point a pressure balance is reached which holds the valve 188 slightly off its seat and maintains the desired retarding pressure, greater than normal RO, in the return cylinder 130. Any further advance of the cam 12a spills oil through the relief valve 108b and this maintains the piston 184 and valve 188 in the balancing position. It is the momentum of the load 122 moving past the predetermined point in its travel at which the cam 12b pressurizes the fluid pressure motor containing the piston 184 which causes the rapid increase in pressure in cylinder 130 by forcing oil through the restriction. Almost immediately, the pressure in chamber 130 increases to a value which, acting on the relatively small exposed area of the end of the valve 188 is sufficient to prevent seating of the valve. This high pressure on the left hand side of the piston 128 is sufficient to overcome the momentum of the load 122 and decelerate it in strict obedience to the levelling off cam contours at motivator sections d and e. This strict obedience prevents the load device from overrunning the cams 12d and 12e, and insures that the pressure in the liquid columns 150d and 150e never falls near the low pressure limit established by the replenish valves 106d and 106e communicating with the low pressure reservoir 104. This is important in preserving the correct timed relationship between the various load devices 110, 118, 122.

Thereafter, the cam at motivator section b may drop back to its base circle after the load 122 is stopped at its left hand limit stop, allowing the piston 184 to shift back to its limit stop 194. Then the normal counterbias pressure from the source RO urges the piston 128 back to the right following the liquid columns 150d and 150e which are responsive to the slowly falling contours of the cams at sections d and e. When the load device or machine element has been returned to the right to its rest position determined by the limit stop means 124, a full cycle of shifting has been completed.

The limit stop 194 for the piston 184 may be adjusted to govern the exact time during the cycle when the intensified counterbias is to be applied. If the limit stop 194 is unscrewed all the way to the left, for instance, there will be a small delay after the cam starts to rise at motivator section b before the piston 184 traverses the cylinder 174 and approaches the seat in the opening 180. If, on the other hand, the limit stop 194 is screwed inwardly to the right, the piston 184 will have less distance to travel as the cam at motivator section d rises and will sooner approach the seat enough to restrict the escape opening 180. This, in essence provides a fine adjustment which permits wider latitude in cam design for the cam at motivator section b.

It will be noted that the difference in area between the opening 180 and the rear face of the piston 184, combined with the relief spring pressure of the balancing valve 102b, will determine the value of the momentum absorbing counterbias. For instance, if the relief valve 108b is set to open at 400 p.s.i., and the ratio between the face areas of the differential piston 184 is 3 to 1, a pressure of 1,200 p.s.i. will be built up on the chamber 130 before the valve 188 unseats. Since these springs and ratios may be altered according to specific design requirements, a large diameter piston rod 132 for the motor 126 may be provided for structural reasons and so that only a relatively small quantity of oil need flow through the restricted orifice at 180 during load deceleration, thus reducing erosion factors at the orifice. While this creates a smaller effective area on the piston 128 against which the high pressure reaction bias may act, the pressure may be built up to relatively high values easily sufficient to control deceleration of the massive load 122.

Furthermore, the decelerating valve, being a reaction type momentum absorber with a variable instead of a fixed escape orifice, maintains a constant pressure on the left hand side of the piston 128. The pressure is determined by the setting of the relief valve 108b and the differential areas on the piston 184, as noted above, and corresponds to the combined forces of the momentum of the decelerating load and the transmitter pressure in motivator sections d and e. As the momentum decreases during deceleration of the load, the pressure in the driving liquid column means may keep the load moving toward the advanced position limit stop with the desired motion characteristics designed into the cams.

It is desirable to have the heavy mass 122 come to rest gently against its advance stop 124. Ideally this would mean that the load would stop moving due to the retarding action of the decelerating pressure at the exact instant that it strikes the stop. In practice this may be difficult to achieve. One reason is that near the end of the retarding stroke the weight is moving very slowly. Consequently it is pushing oil very slowly through the restriction formed by the valve 188 and this lets the valve 188 approach nearer its seat. Then there is a slowly moving piston 128 which cannot move oil quickly through the valve, and this must be balanced with a piston 184 urged toward the right by very high pressure at its left, as determined by the setting of the relief valve 108b and capable of very rapid movement to the right through a sufficient distance to seat the valve completely. This makes it difficult to achieve the precise stopping desired.

I have found that I can achieve greater precision and softer action in stopping the weight with the form of the invention shown in FIG. 3. This is constructed in general as illustrated in FIG. 2 and as described above, the difference being that I maintain communication at all times between the return cylinder 130 and RO, preferably through a passage having a choke or controlling cross section of small area. This provides a passage around the valve or through the valve 188 when the valve is firmly seated. This may take the form of an axial bore 200 of small diameter communicating with a radial bore 202 formed in the plug 186.

The bore 200 may be formed in a removable plug 204 threaded into the plug 186. This facilitates changing bore size to meet the conditions required by any particular installation. The choice of bore size is influenced by weight of the load 122 and the length of its decelerating path.

This construction operates in the following manner. By the time the load has approached very close to its advance stop 124 it is moving very slowly. Even so, because the load is of large mass, it can not be allowed to strike the stop at this speed. This slow movement of the load pushes oil through the orifice formed between the valve 188 and the seat 180 at a slow rate and in order to maintain the pressure balance described above the piston 184 automatically moves to the right to restrict the orifice further. As long as there is any space between the valve 188 and the seat 180 the motion of the load is being controlled and retarded by the relatively high pressure behind the piston 184. As the load reaches some point very close to the advance stop 124, this high pressure seats the valve 188 tightly against the seat 180. This entirely removes the high pressure control by the piston 184. However the load is now being retarded by the relatively low pressure of RO communicated to the return cylinder 130 through the passage 200. Because the load is moving so slowly this relatively low pressure of RO is sufficient to retard it during the rest of its movement and matches the retarding speed with the speed of movement of the load. I have found that this eases the load very gently against the advance stop 124.

By this operation I remove the load from the control of the high pressure in line 150b in response to the speed of the load and thereafter continue to retard the load by the relatively low pressure of RO.

Increased counterbias is created by providing a restricted orifice as the only escape opening for fluid escaping from one side of the shifting piston 128. In addition, this restricted orifice is created only at the desired time in each cycle when deceleration of a relatively massive load is required, and only for the specific motivator section involved. During the remainder of the cycle, the normal counter-biasing force from the source RO may act upon such a load device.

While the above described embodiment constitutes a preferred mode of carrying out this invention, many other forms might be adopted within the scope of the actual invention, which is variously claimed as:

1. In a device for cyclically moving a mass the combination of a variable volume fluid pressure counterbiasing chamber, a source of fluid pressure connected to the chamber, a first actuator including a variable volume transmitter connected by a closed liquid column to a variable volume receiver with means for cyclically reducing the volume of the transmitter to increase the volume of the receiver to move the mass in one direction against the force of the counterbiasing chamber and thereby reduce the volume of the chamber to express fluid from the chamber to the source, means for restricting flow from the chamber and thereby maintaining in the chamber a pressure greater than the pressure of the source, a second actuator including a second variable volume transmitter connected by a closed liquid column to a second variable volume receiver with means for cyclically reducing the volume of the second transmitter to actuate said restricting means, and means for actuatng said transmitters in timed relation to restrict flow from the chamber when the mass has been moved to a predetermined position by said first receiver.

2. In a device for cyclically moving a mass the combination of a variable volume fluid pressure counterbiasing chamber, a source of fluid pressure continuously connected to the chamber, an actuator including a variable volume transmitter connected by a closed liquid column to a variable volume receiver with means for cyclically reducing the volume of the transmitter to increase the volume of the receiver to move the mass in one direction against the force of the counterbiasing chamber, and thereby reduce the volume of the chamber to express fluid from the chamber to the source, and means responsive to a predetermined position of the mass in being moved in said direction for restricting flow from the chamber and thereby maintain in the chamber a pressure greater than the pressure of the source.

3. A device for cyclically moving a mass comprising in combination a variable volume counterbiasing chamber having a passage for flow of fluid therefrom, a source of pressure connected to the chamber, means for repeatedly moving a mass throughout a path in one direction against the force of pressure in the chamber to express fluid through the passage, a valve urged to restrict flow from the chamber through the passage and oppositely urged by the pressure of the chamber to permit unrestricted flow, the valve being urged to restrict flow by a fluid pressure motor, means responsive to movement of the mass in said one direction to a predetermined position for pressurizing the motor and means for limiting the maximum pressure in the motor to maintain in the chamber a constant pressure greater than the pressure of said source.

4. A device for cyclically moving a mass comprising in combination a variable volume counterbiasing chamber having a passage for flow of fluid therefrom, a source of pressure connected to the chamber, means for repeatedly moving a mass throughout a path in one direction against the force of pressure in the chamber to express fluid through the passage, a valve urged to restrict flow from the chamber through the passage and oppositely urged by the pressure of the chamber to permit unrestricted flow, the valve being urged to restrict flow by a fluid pressure motor, and means responsive to movement of the mass in said one direction to a predetermined position for pressurizing the motor.

5. A device for retarding a mass comprising in combination a variable volume counterbiasing chamber having a passage for flow of fluid therefrom, a source of pressure connected to the chamber, means for moving a mass throughout a path in one direction against the force of pressure in the chamber to express fluid through the passage, a valve urged to restrict flow from the chamber through the passage and oppositely urged by the pressure of the chamber to permit unrestricted flow, the valve being urged to restrict flow by a fluid pressure motor, and means for pressurizing the motor when the mass reaches a predetermined position in its movement in said direction.

6. A device for cyclically moving a mass comprising in combination a variable volume counterbiasing chamber, a source of pressure continuously connected to the chamber through a passage, means for repeatedly moving a mass throughout a path in one direction to reduce the volume of the chamber and express fluid to the source and means operated when the mass reaches a predetermined position in its movement in said direction for restricting flow of fluid from the chamber to the source to maintain in the chamber a pressure greater than the source.

7. A device for cyclically moving a mass comprising in combination a variable volume counterbiasing chamber having a passage for flow of fluid therefrom, a source of pressure continuously connected to the passage, means for repeatedly moving a mass throughout a path in one direction against the force of pressure in the chamber to express fluid through the passage to the source and means for yieldingly restricting the passage with a substantially constant force to provide a substantially constant pressure in the chamber greater than the pressure of said source when the mass reaches a predetermined position in its movement in said direction.

8. A device for cyclically moving a mass comprising in combination a variable volume counterbiasing chamber having a passage for flow of fluid therefrom, a source of pressure continuously connected to the passage, means for repeatedly moving a mass throughout a path in one direction against the force of pressure in the chamber to express fluid through the passage to the source and means for yieldingly restricting the passage to provide a pressure in the chamber greater than the pressure of said source when the mass reaches a predetermined position in its movement in said direction.

9. A device for cyclically moving a mass comprising in combination a variable volume counterbiasing chamber having a passage for flow of fluid therefrom, a source of pressure continuously connected to the chamber, means for repeatedly moving a mass throughout a path in one direction against the force of pressure in the chamber to express fluid through the passage to the source and means for increasing the pressure in the chamber to a higher constant value than the pressure of the source in response to movement of the mass in said direction beyond a predetermined position.

10. A device for retarding a moving mass comprising in combination a variable volume counterbiasing chamber having a passage for flow of fluid therefrom, a source of pressure continuously connected to the passage, means for moving a mass throughout a path in one direction against the force of pressure in the chamber to express fluid through the passage to the source and means for increasing the pressure in the chamber in response to movement of the mass in said direction beyond a predetermined position.

11. A device for cyclically moving two masses in timed relation comprising in combination two variable volume fluid pressure counterbiasing chambers each associated with one mass for opposing movement of such one mass in one direction, a common source of fluid pressure connected to the chambers, an actuator associated with each mass, each of the actuators including a variable volume transmitter connected by a closed liquid column to a variable volume receiver with means for cyclically reducing the volume of the transmitter to increase the volume of the receiver to move the associated mass in one direction against the force of the associated counterbiasing chamber and thereby reduce the volume of the chamber to express fluid from the chamber to the common source, means between one chamber and the source which when actuated restricts flow from said one chamber to the source, a third actuator including a third variable volume transmitter connected by a closed liquid column to a third variable volume receiver with means for cyclically reducing the volume of the third transmitter to increase the volume of the third receiver to actuate the restricting means, and means for actuating said transmitters in timed relation to increase the pressure in one counterbiasing chamber and maintain the pressure of the source in the other counterbiasing chamber when one mass has been moved beyond a predetermined position by its associated actuator.

12. A device for cyclically moving two masses in timed relation comprising in combination two variable volume fluid pressure counterbiasing chambers each associated with one mass for opposing movement of such one mass in one direction, a common source of fluid pressure connected to the chambers, means for repeatedly moving the masses in timed relation throughout paths in said directions against the force of the respective chambers, and means responsive to the movement of one mass in said direction beyond a predetermined position for increasing the pressure in the chamber associated with said one mass above the pressure of the source while maintaining the pressure of the source in the other chamber.

13. A device for cyclically moving a mass comprising in combination a first variable volume fluid pressure counterbiasing chamber, a second variable volume fluid pressure counterbiasing chamber having a movable wall, a fluid conduit connecting the chambers, a source of fluid pressure connected to the second chamber, a valve in the second chamber on said movable wall, a fluid pressure motor for yieldingly urging the valve against the pressure of the second chamber toward a position in which it restricts flow from the first chamber to the second chamber, means for moving the mass repeatedly in one direction throughout a path against the force of the first chamber, and means responsive to movement of the mass in said direction to a predetermined position for pressurizing the motor yieldingly to hold the valve in restricting position.

14. A device for retarding a moving mass comprising in combination a variable volume fluid pressure chamber for opposing movement of the mass in one direction, a source of pressure connected to the chamber through a passage that is always open, means for moving the mass throughout a path in said direction against the force of pressure in the chamber to express fluid from the chamber to the source, and means operated in response to the position of the mass for restricting the rate of flow while always maintaining flow from the chamber to the source.

15. A device for retarding a moving mass comprising in combination a variable volume fluid pressure chamber for opposing movement of the mass in one direction having a passage for flow of fluid therefrom, a source of pressure connected to the chamber through said passage, means for moving a mass throughout a path in said direction against the force of pressure in the chamber to express fluid through the passage to the source, a valve for closing the passage and urged by the pressure of the chamber to open the passage, means for operating the valve to close the passage in response to the position of the mass, and means defining a passage that is always open connecting the chamber and the source.

16. A device for retarding a moving mass comprising in combination a variable volume fluid pressure chamber for opposing movement of the mass in one direction having a passage for flow of fluid therefrom, a source of pressure connected to the chamber through said passage, means for moving a mass throughout a path in said direction against the force of pressure in the chamber to express fluid through the passage to the source, a valve for closing the passage and urged by the pressure of the chamber to open the passage, means for operating the valve to close the passage in response to the position of the mass, and a restricted, slow-flow passage through the valve constantly connecting the chamber and the source.

17. A device for retarding a moving mass comprising in combination a variable volume fluid pressure chamber for opposing movement of the mass in one direction having a passage for flow of fluid therefrom, a source of relatively low pressure connected to the chamber through said passage, means for moving a mass throughout a path in said direction against the force of pressure in the chamber to express fluid through the passage to the source, means for increasing the pressure in the chamber to decelerate the mass rapidly, and means for subsequently reducing the pressure in the chamber to decelerate the mass slowly.

18. A device for retarding a moving mass comprising in combination a variable volume fluid pressure chamber for opposing movement of the mass in one direction having a passage for flow of fluid therefrom, a source or relatively low pressure connected to the chamber through said passage, means for moving a mass throughout a path in said direction against the force of pressure in the chamber to express fluid through the passage to the source, means for increasing the pressure in the chamber to decelerate the mass rapidly, and means responsive to the speed of the mass for subsequently reducing the pressure in the chamber to decelerate the mass slowly.

19. A device for retarding a moving mass comprising in combination a variable volume fluid pressure chamber for opposing movement of the mass in one direction having a passage for flow of fluid therefrom, a source of relatively low pressure connected to the chamber through said passage, means for moving a mass throughout a path in said direction against the force of pressure in the chamber to express fluid through the passage to the source, means for increasing the pressure in the chamber to decelerate the mass rapidly, and means for subsequently reducing the pressure in the chamber substantially to the pressure of the source to decelerate the mass slowly.

20. A device for retarding a moving mass comprising in combination a variable volume fluid pressure chamber for opposing movement of the mass in one direction having a passage for flow of fluid therefrom, a source of relatively low pressure connected to the chamber through said passage, means for moving a mass throughout a path in said direction against the force of pressure in the chamber to express fluid through the passage to the source, means for increasing the pressure in the chamber to decelerate the mass rapidly, and means responsive to the speed of the mass for subsequently reducing the pressure in the chamber substantially to the pressure of the source to decelerate the mass slowly.

No references cited.

MARTIN P. SCHWADRON, *Primary Examiner.*

ROBERT R. BUNEVICH, *Examiner.*